(12) United States Patent
Park

(10) Patent No.: US 8,795,878 B2
(45) Date of Patent: Aug. 5, 2014

(54) SECONDARY BATTERY

(75) Inventor: Jounghwan Park, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 458 days.

(21) Appl. No.: 12/801,100

(22) Filed: May 21, 2010

(65) Prior Publication Data

US 2010/0330412 A1 Dec. 30, 2010

(30) Foreign Application Priority Data

Jun. 29, 2009 (KR) .................. 10-2009-0058361

(51) Int. Cl.
*H01M 2/00* (2006.01)

(52) U.S. Cl.
USPC ................ 429/163; 429/7; 429/186

(58) Field of Classification Search
USPC ............... 429/7, 53, 122, 161, 163, 180, 182, 429/138, 175, 177, 186
See application file for complete search history.

(56) References Cited

U.S. PATENT DOCUMENTS

| 3,661,649 | A | * | 5/1972 | Kaye | 429/163 |
| 2001/0041284 | A1 | * | 11/2001 | Tsurutani et al. | 429/56 |
| 2005/0089753 | A1 | * | 4/2005 | Yoon | 429/180 |
| 2007/0151590 | A1 | | 7/2007 | Kang | |

FOREIGN PATENT DOCUMENTS

| KR | 10 2006-0027270 A | | 3/2006 | | |
| KR | 10 2006-0028187 A | | 3/2006 | | |
| KR | 100601543 | * | 7/2006 | ............. | H01M 2/14 |
| KR | 10 2006-0087002 A | | 8/2006 | | |
| KR | 10-0709874 B1 | | 4/2007 | | |
| KR | 100709874 | * | 4/2007 | ............. | H01M 10/04 |
| KR | 10 2007-0108765 A | | 11/2007 | | |
| KR | 1020070108765 | * | 11/2007 | ............. | H01M 2/02 |

OTHER PUBLICATIONS

Korean Office Action in KR 10-2009-0058361, dated Nov. 22, 2010 (Park).

* cited by examiner

*Primary Examiner* — Milton I Cano
*Assistant Examiner* — Jimmy K Vo
(74) *Attorney, Agent, or Firm* — Lee & Morse, P.C.

(57) ABSTRACT

A secondary battery including an electrode assembly, a can including a bottom plate and a sidewall extending from the bottom plate, the can being configured to accommodate the electrode assembly, and an insulating case including a plate-shaped main body facing the electrode assembly and a support part extending from the main body, the insulating case being accommodated in the can, wherein the support part of the insulating case includes at least one support wall bent from the main body.

10 Claims, 9 Drawing Sheets

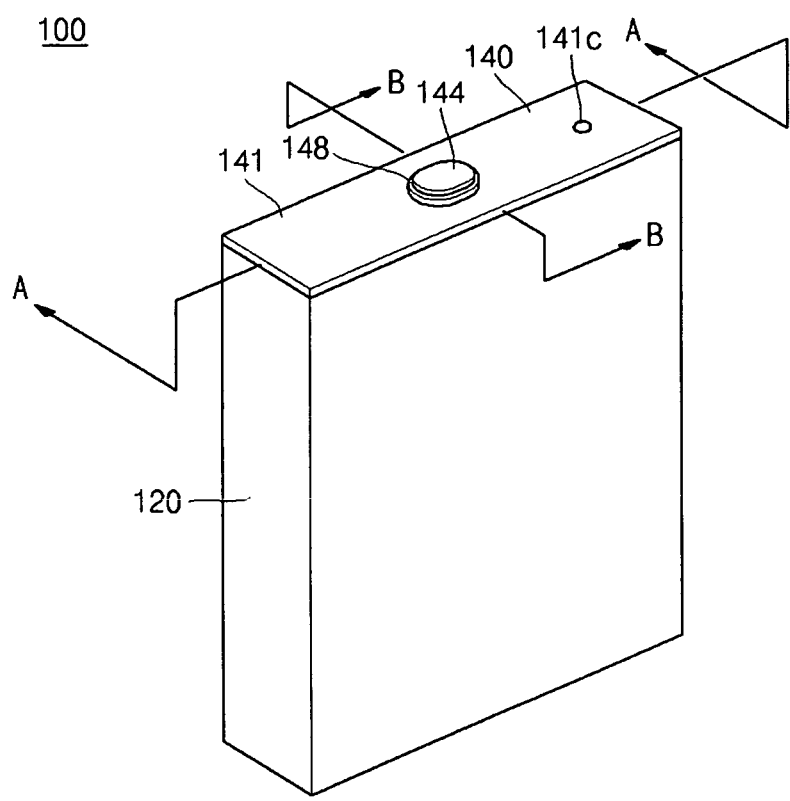

SECONDARY BATTERY

This application claims the benefit under 35 USC 119(a-d) of Korean Patent Application No. 10-2009-0058361, filed on Jun. 29, 2009, the contents incorporated by reference herein in its entirety.

BACKGROUND

1. Field

Embodiments relate to a secondary battery.

2. Description of the Related Art

Recently, the use of portable electronic devices has increased with the rapid development of communication and computer industries. Rechargeable secondary batteries are widely used as power sources of portable electronic devices.

In a secondary battery, an electrode assembly may be accommodated in an outer case. Secondary batteries may be classified into, e.g., pouch and can types, according to their outer cases. Can type secondary batteries may be further classified into, e.g., cylinder and prismatic types, according to the shape of the cans. Generally, a prismatic secondary battery includes an electrode assembly, a prismatic can housing the electrode assembly, a cap assembly configured to close an opening of the can, and an insulating case disposed in the can to insulate the electrode assembly and the cap assembly.

SUMMARY

Embodiments are directed to a secondary battery, which represent advances over the related art.

It is a feature of an embodiment to provide a secondary battery that may be easily fabricated at lower cost.

At least one of the above and other features and advantages may be realized by providing a secondary battery including an electrode assembly, a can including a bottom plate and a sidewall extending from the bottom plate, the can being configured to accommodate the electrode assembly, and an insulating case including a plate-shaped main body facing the electrode assembly and a support part extending from the main body, the insulating case being accommodated in the can, wherein the support part of the insulating case includes at least one support wall bent from the main body.

The insulating case may include a bending groove between the main body and the support wall.

The support part may include a plurality of support walls separated from each other.

The main body of the insulating case may have a rectangular shape with two mutually facing long sides and two mutually facing short sides, and the support walls may be disposed on the two mutually facing long sides of the main body.

The main body of the insulating case may have a rectangular shape with two mutually facing long sides and two mutually facing short sides, and the support walls may be disposed on the two mutually facing short sides of the main body.

The main body of the insulating case may have a rectangular shape with two mutually facing long sides and two mutually facing short sides, and the support walls may be disposed on long and short sides of the main body.

The support walls may have lengths that are the same as lengths of corresponding sides of the main body.

The support walls disposed on the two mutually facing long sides of the main body may be shorter in length than the two mutually facing long sides of the main body.

Each of the support walls may form an angle of about 75° to about 105° with respect to the main body.

The support part may further include at least one support wall not bent from the main body.

The can may further include a separation prevention part configured to prevent detachment of the insulating case.

The separation prevention part may include a stopper contacting an upper end of at least one of the support walls.

The separation prevention part may include a plurality of the stoppers, the support part may include a plurality of the support walls, and the stoppers may correspond to the support walls.

An inwardly bent extension extending from an upper end of the sidewall of the can may form the stopper.

The separation prevention part may include a catch groove in the sidewall of the can.

The support wall of the insulating case may include a latch part for insertion into the catch groove.

BRIEF DESCRIPTION OF THE DRAWINGS

The above and other features and advantages will become more apparent to those of ordinary skill in the art by describing in detail exemplary embodiments with reference to the attached drawings, in which:

FIG. 1 illustrates a perspective view of a secondary battery according to an embodiment;

DETAILED DESCRIPTION

Figure 2A:
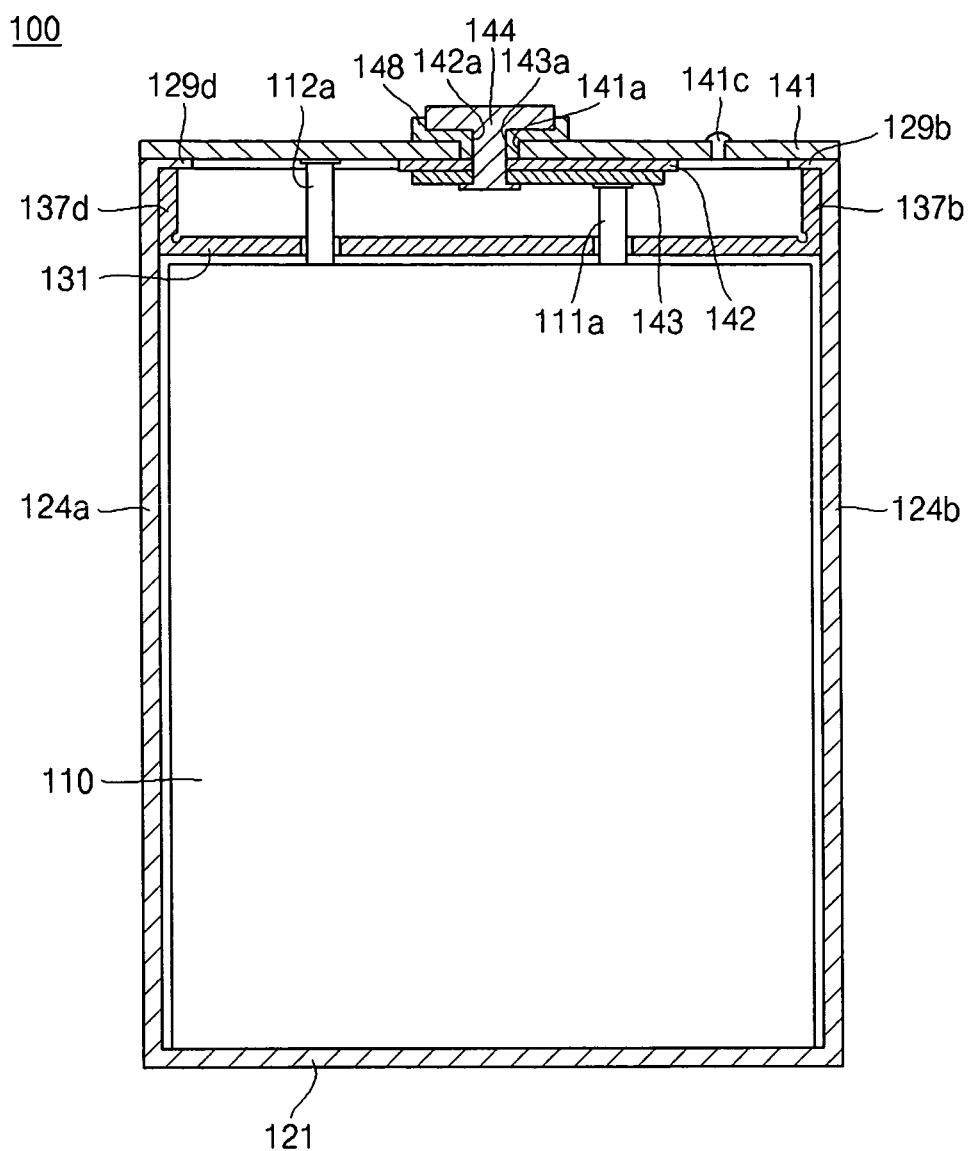
FIG. 2A illustrates a cross-sectional view taken along line A-A of FIG. 1.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2B:
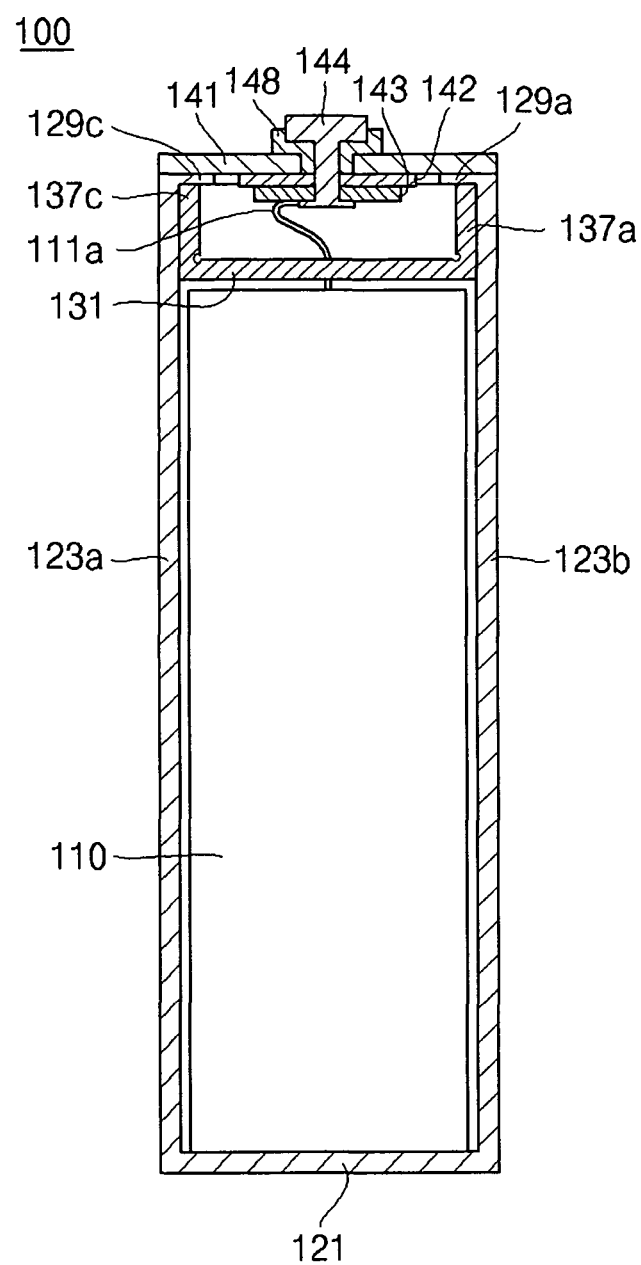
FIG. 2B illustrates a cross-sectional view taken along line B-B of FIG. 1.
Figure 3:
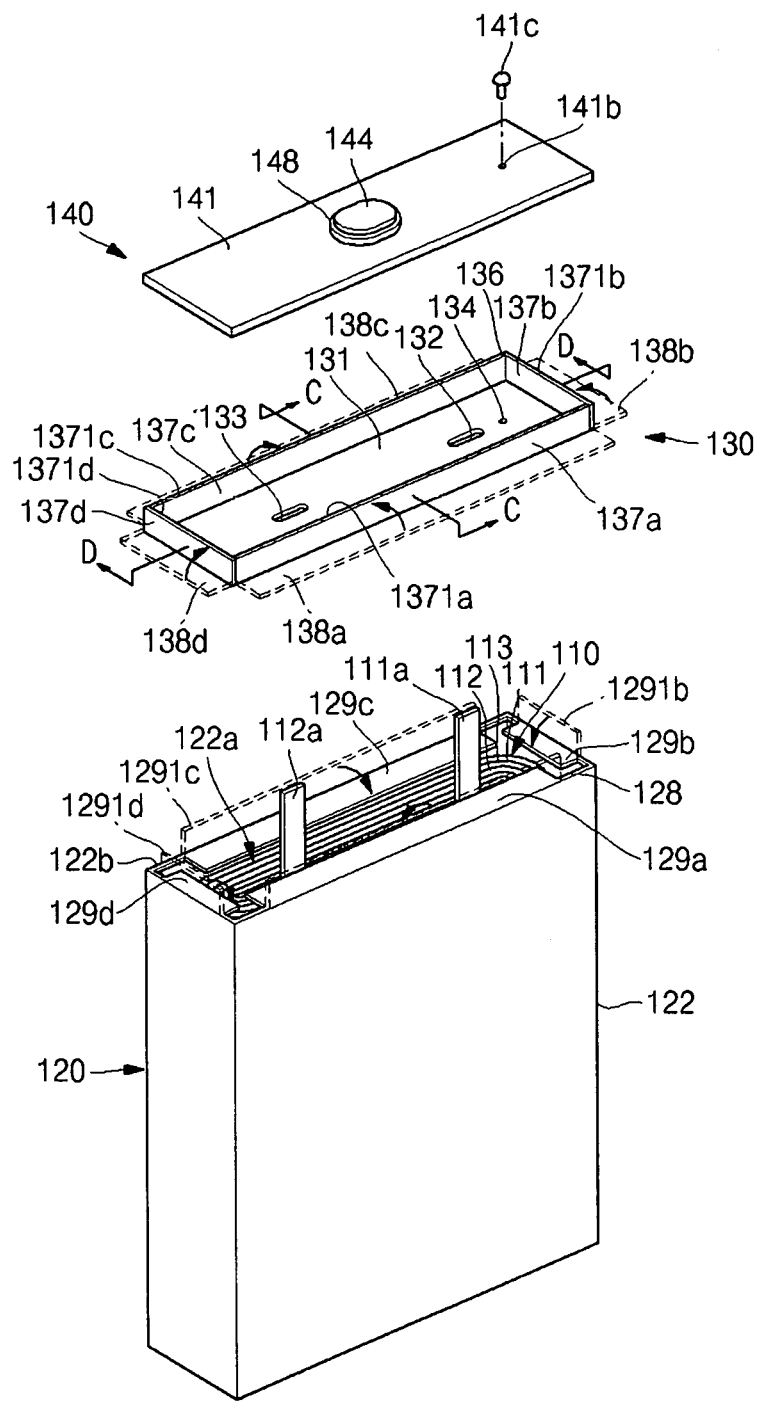
FIG. 3 illustrates an exploded perspective view of the secondary battery of FIG. 1.
Figure 4A:
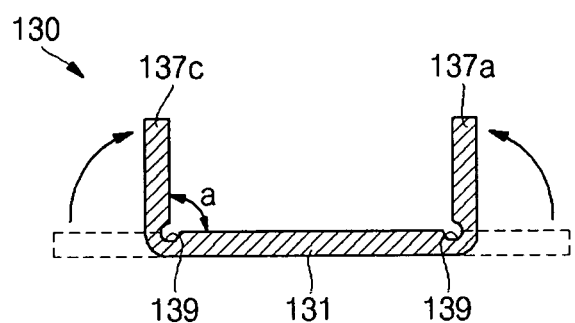
FIG. 4A illustrates a cross sectional view of an insulating case of FIG. 3, taken along line C-C.
Figure 4B:
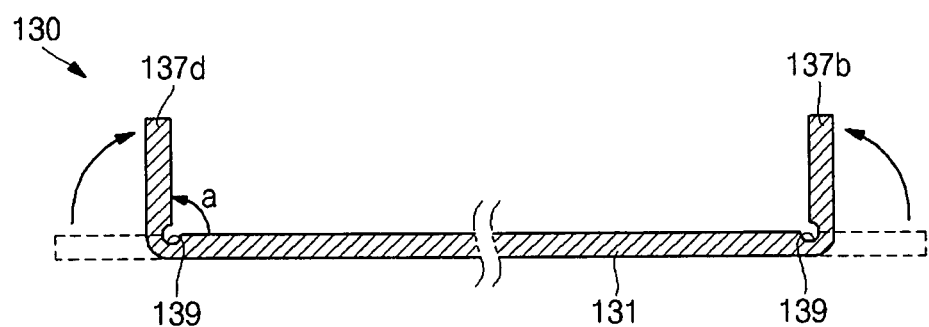
FIG. 4B illustrates a cross sectional view of the insulating case of FIG. 3, taken along line D-D.

First, a secondary battery according to an embodiment will be described. FIGS. 1 to 4B illustrate a secondary battery according to an embodiment. FIG. 1 illustrates a perspective view of the secondary battery. FIGS. 2A and 2B illustrate cross-sectional views taken along lines A-A and B-B of FIG. 1. FIG. 3 illustrates an exploded perspective view of the secondary battery of FIG. 1. FIGS. 4A and 4B illustrate cross-sectional views of an insulating case of FIG. 3, taken along lines C-C and D-D.

Referring to FIGS. 1 to 3, a secondary battery 100 may include an electrode assembly 110, a can 120, an insulating case 130, and a cap assembly 140. The secondary battery 100 may store electrical energy supplied from a battery charger (not shown) and may supply the stored electric energy to an external load (not shown).

The electrode assembly 110 may include a first electrode plate 111, a second electrode plate 112, and a separator 113 between the first and second electrode plates 111 and 112. The first electrode plate 111, the second electrode plate 112, and the separator 113 may be wound in the form of a jelly roll. A first electrode tab 111a may be coupled to the first electrode plate 111 and may protrude from a top side of the electrode assembly 110. A second electrode tab 112a may be coupled to the second electrode plate 112 and may protrude from the top side of the electrode assembly 110. The first electrode plate 111 may be a negative electrode plate and the second electrode plate 112 may be a positive electrode plate. Thus, the first electrode tab 111a may be a negative electrode tab and the second electrode tab 112a may be a positive electrode tab. However, the embodiments are not limited thereto. Alternatively, the first electrode plate 111 may be a positive electrode plate and the second electrode plate 112 may be a negative electrode plate. In this case, the first electrode tab 111a may be a positive electrode tab and the second electrode tab 112a may be a negative electrode tab.

The can 120 may include a bottom plate 121, a sidewall 122, and a separation prevention part 128. The electrode assembly 110 and the insulating case 130 may be accommodated in the can 120. The can 120 may be formed of a metal, e.g., light and ductile aluminum or an aluminum alloy. However, materials that may be used for forming the can 120 are not limited thereto. The bottom plate 121 may have an elongated rectangular shape.

The sidewall 122 may be approximately perpendicular to the bottom plate 121 and may be connected to edges of the bottom plate 121. The sidewall 122 may include mutually facing long walls 123a and 123b, and mutually facing short walls 124a and 124b. A rectangular opening 122a may be formed at an end part 122b of the sidewall 122 as an opening for inserting the electrode assembly 110 and the insulating case 130 into the can 122. The opening 122a may be sealed by the cap assembly 140.

The separation prevention part 128 may include a plurality of stoppers 129a, 129b, 129c, and 129d. The insulating case 130 may not be separated from the can 120 due to, e.g., the presence of the separation prevention part 128.

The stoppers 129a, 129b, 129c, and 129d may extend from an end part 122b of the sidewall 122 toward a center of the opening 122a. The stoppers 129a, 129b, 129c, and 129d may be disposed on respective long walls 123a and 123b and short walls 124a and 124b. As illustrated by dashed lines in FIG. 3, extensions 1291a, 1291b, 1291c, and 1291d may extend from the end part 122b of the sidewall 122 in parallel with the sidewall 122. The stoppers 129a, 129b, 129c, and 129d may be formed by bending the extensions 1291a, 1291b, 1291c, and 1291d toward the opening 122a. That is, after the electrode assembly 110 and the insulating case 130 are inserted into the can 120 through the opening 122a, the stoppers 129a, 129b, 129c, and 129d may be formed by bending the extensions 1291a, 1291b, 1291c, and 1291d.

The insulating case 130 may include a main body 131 and a support part 136. When assembled, the insulating case 130 may be accommodated in the can 120 between the electrode assembly 110 and the cap assembly 140. The insulating case 130 may provide insulation between the electrode assembly 110 and the cap assembly 140. The can 120 may prevent the electrode assembly 110 from moving inside the can 120. The insulating case 130 may be formed of an insulating material, e.g., polypropylene (PP).

The main body 131 may have a plate shape corresponding to the shape of the opening 122a. The main body 131 may include a first electrode tab hole 132, a second electrode tab hole 133, and an electrolyte introduction hole 134. The main body 131 may face the electrode assembly 110 and may provide electric insulation between the electrode assembly 110 and the cap assembly 140. When assembled, the first electrode tab 111a of the electrode assembly 110 may be inserted through the first electrode tab hole 132. The second electrode tab 112a of the electrode assembly 110 may be inserted through the second electrode tab hole 133. Electrolyte may be introduced into the electrode assembly 110 through the electrolyte introduction hole 134.

The support part 136 may include a plurality of bent support walls 137a, 137b, 137c, and 137d. The support part 136 may contact the sidewall 122 of the can 120 and may support the main body 131. Thus, the electrode assembly 110 may be held in the can 120 without movement thereto relative to the can 120.

The support walls 137a, 137b, 137c, and 137d may be approximately perpendicular to the main body 131 and may be coupled to edges of the main body 131. The support walls 137a, 137b, 137c, and 137d may be disposed on corresponding sides of the main body 131. Each of the support walls 137a, 137b, 137c, and 137d may have a length that is the same as a length of the corresponding side of the main body 131. The support walls 137a, 137b, 137c, and 137d may have the same height as one another. Ends 1371a, 1371b, 1371c, and 1371d of the support walls 137a, 137b, 137c, and 137d may abut against the stoppers 129a, 129b, 129c, and 129d of the can 120, respectively. Therefore, the insulating case 130 may not disengage from inside of the can 120.

As illustrated by dashed lines in FIG. 3, extension wings 138a, 138b, 138c, and 138d may extend from four sides of the main body 131 to be coplanar with the main body 131. The support walls 137a, 137b, 137c, and 137d may be formed by bending the extension wings 138a, 138b, 138c, and 138d until the extension wings 138a, 138b, 138c, and 138d become approximately perpendicular to the main body 131. Bending grooves 139 may be disposed between the support walls 137a, 137b, 137c, and 137d and the main body 131 (FIGS. 4A and 4B). Since the thickness of the main body 131 may be reduced at the bending grooves 139, the extension wings 138a, 138b, 138c, and 138d may be easily bent to form the support walls 137a, 137b, 137c, and 137d.

An angle (a) between the support walls 137a, 137b, 137c, and 137d and the main body 131 may be 90°±15°, i.e., about 75° to about 105°. Maintaining the angle at about 75° to about 105° may help ensure that the ends 1371a, 1371b, 1371c, and 1371d of the support walls 137a, 137b, 137c, and 137d are easily located adjacent to the stoppers 129a, 129b, 129c, and 129d.

The cap assembly 140 may include a cap plate 141, an insulating plate 142, a terminal plate 143, and an electrode terminal 144. The cap assembly 140 may close the opening 122a of the can 120. Two terminals of the secondary battery 100 may be disposed on the cap assembly 140.

The cap plate 141 may include a terminal hole 141a and an electrolyte injection hole 141b. The cap plate 141 may be, e.g., a rectangular metal plate having a size and shape corresponding to the size and shape of the opening 122a of the can 120. The cap plate 141 may be placed on the end part 122b of the sidewall 122 and the stoppers 129a, 129b, 129c, and 129d of the can 120 and may be coupled to the can 120 by, e.g., laser welding, so as to close the opening 122a of the can 120. The second electrode tab 112a of the electrode assembly 110 may be coupled to the cap plate 141 by, e.g., laser welding, so that the cap plate 141 may function as a second terminal of the secondary battery 100.

The terminal hole 141a may be disposed in a center part of the cap plate 141. When assembled, the electrode terminal 144 may be inserted through the terminal hole 141a.

The electrolyte injection hole 141b may be disposed at a side of the terminal hole 141a. Electrolyte may be supplied into the can 120 through the electrolyte injection hole 141b. After electrode is supplied, the electrolyte injection hole 141b may be closed using a plug 141c.

A first passage hole 142a may be disposed in a side of the insulating plate 142. The electrode terminal 144 may be inserted through the first passage hole 142a. The insulating plate 142 may contact an inner surface of the cap plate 141 (facing the electrode assembly 110) and may provide electric insulation between the terminal plate 143 and the cap plate 141.

The terminal plate 143 may contact the insulating plate 142 and may be electrically insulated from the cap plate 141 by the insulating plate 142. That is, since the insulating plate 142 may be disposed between the terminal plate 143 and the cap plate 141, the terminal plate 143 and the cap plate 141 may be electrically insulated from each other. The first electrode tab 111a of the electrode assembly 110 may be coupled to the terminal plate 143 by, e.g., laser welding. A second passage hole 143a may be disposed in a side of the terminal plate 143. The electrode terminal 144 may be inserted through the second passage hole 143a. The terminal plate 143 may be formed of, e.g., nickel, but is not limited thereto.

The electrode terminal 144 may be inserted through the terminal hole 141a of the cap plate 141 and may be coupled to the terminal plate 143. The electrode terminal 144 may be electrically connected to the first electrode tab 111a and electrically insulated from the cap plate 141 by a gasket 148, so that the electrode terminal 144 may function as a first terminal of the secondary battery 100.

Figure 5:
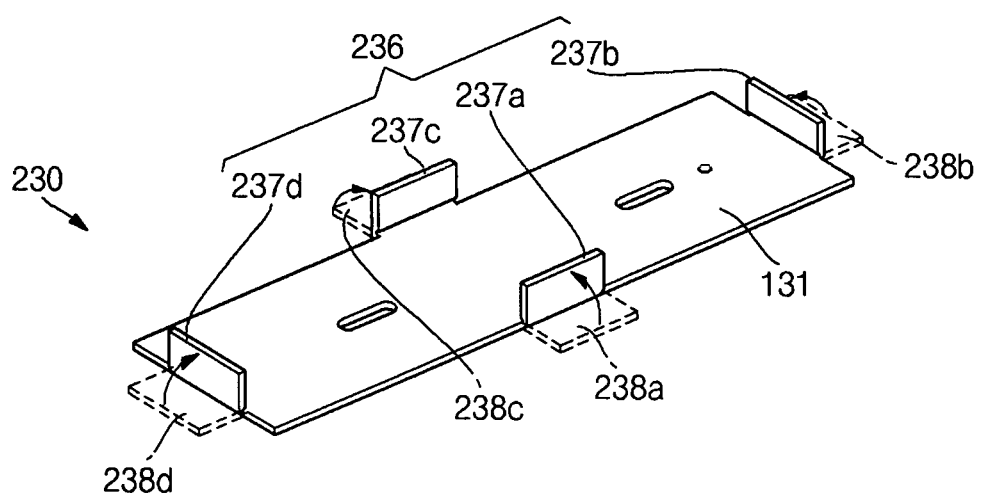
FIG. 5 illustrates a perspective view of an insulating case included in a secondary battery according to another embodiment.

Next, a secondary battery according to another embodiment will be described. FIG. 5 illustrates a perspective view of an insulating case included in a secondary battery according to another embodiment. In the current embodiment, the same elements as those of the previous embodiment will be denoted with the same reference numerals.

Referring to FIG. 5, an insulating case 230 may include a main body 131 and a support part 236. The insulating case 230 may have the same structure as that of the insulating case 130 of the previous embodiment except for the support part 236. Thus, only the support part 236 will be described in detail below.

The support part 236 may include a plurality of support walls 237a, 237b, 237c, and 237d. Each of the support walls 237a, 237b, 237c, and 237d may be approximately perpendicular to the main body 131 and may be connected to an edge of the main body 131. The support walls 237a, 237b, 237c, and 237d may be coupled to respective sides of the rectangular main body 131. Each of the support walls 237a, 237b, 237c, and 237d may have a length shorter than a length of its corresponding side of the main body 131. The support walls 137a, 137b, 137c, and 137d may have the same height as one another.

As illustrated by dashed lines in FIG. 5, extension wings 238a, 238b, 238c, and 238d may extend from the main body 131 in the same plane as the main body 131. Support walls 237a, 237b, 237c, and 237d may be formed by bending the extension wings 238a, 238b, 238c, and 238d until the extension wings 238a, 238b, 238c, and 238d become approximately perpendicular to the main body 131. Bending grooves (not illustrated) may be disposed between the main body 131 and the extension wings 238a, 238b, 238c, and 238d.

In the insulating case 230 of the current embodiment, the length of the support walls 237a, 237b, 237c, and 237d may be shorter than the length of the corresponding sides of the main body 131. That is, the insulating case 230 may have bent parts that are smaller than those in the insulating case 130 of the previous embodiment. Therefore, the insulating case 230 may be less susceptible to damage at the bent parts.

Stoppers (not shown) of a can (not shown) may be formed according to the support walls 237a, 237b, 237c, and 237d to prevent separation of the insulating case 230 from the can.

Figure 6:
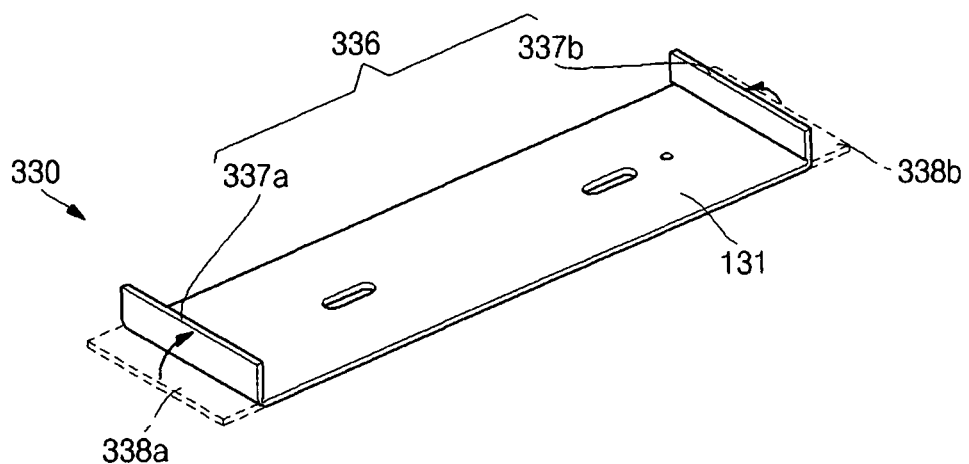
FIG. 6 illustrates a perspective view of an insulating case included in a secondary battery according to yet another embodiment.

Next, a secondary battery according to another embodiment will be described. FIG. 6 illustrates a perspective view of an insulating case included in a secondary battery according to another embodiment. In the current embodiment, the same elements as those of the embodiment illustrated in FIGS. 1 to 4B will be denoted with the same reference numerals.

Referring to FIG. 6, an insulating case 330 may include a main body 131 and a support part 336. The insulating case 330 may have the same structure as that of the insulating case 130 of the embodiment illustrated in FIGS. 1 to 4B except for the support part 336. Thus, only the support part 336 will be described in detail below.

The support part 336 may include two support walls 337a and 337b. Each of the support walls 337a and 337b may be approximately perpendicular to the main body 131. The two support walls 337a and 337b may be disposed on respective short sides of the rectangular main body 131. Each of the support walls 337a and 337b may have a length the same as a length of the corresponding side of the main body 131. The support walls 337a and 337b may have the same height as one another.

As illustrated by dashed lines in FIG. 6, extension wings 338a and 338b may extend from the main body 131 to be coplanar with the main body 131. The two support walls 337a and 337b may be formed by bending the extension wings 338a and 338b until the extension wings 338a and 338b become approximately perpendicular to the main body 131. Bending grooves (not illustrated) may be disposed between the main body 131 and the extension wings 338a and 338b.

In the insulating case 330 of the current embodiment, the two support walls 337a and 337b may be disposed at respective short sides of the main body 131. Therefore, the insulating case 330 may be easily manufactured. That is, the main body 131 and the extension wings 338a and 338b may have a simple rectangular shape.

Stoppers (not shown) of a can (not shown) may be formed corresponding to the support walls 337a and 337b to prevent separation of the insulating case 330 from the can.

Figure 7:
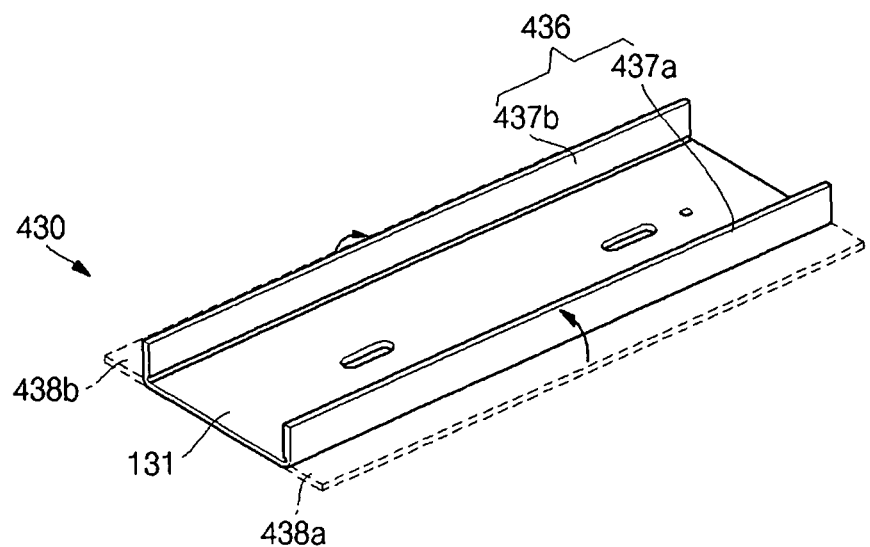
FIG. 7 illustrates a perspective view of an insulating case included in a secondary battery according to a further embodiment.

Next, a secondary battery according to another embodiment will be described. FIG. 7 illustrates a perspective view of an insulating case included in a secondary battery according to another embodiment. In the current embodiment, the same elements as those of the embodiment illustrated in FIGS. 1 to 4B are denoted with the same reference numerals.

Referring to FIG. 7, an insulating case 430 may include a main body 131 and a support part 436. The insulating case 430 may have the same structure as that of the insulating case 130 of the embodiment illustrated in FIGS. 1 to 4B except for the support part 436. Thus, only the support part 436 will be described in detail below.

The support part 436 may include two support walls 437a and 437b. Each of the two support walls 437a and 437b may be approximately perpendicular to the main body 131. The two support walls 437a and 437b may be disposed on respective long sides of the rectangular main body 131. Each of the support walls 437a and 437b may have a length the same as a length of the corresponding side of the main body 131. The support walls 437a and 437b may have the same height as one another.

As illustrated by dashed lines in FIG. 7, extension wings 438a and 438b may extend from the main body 131 to be coplanar with the main body 131. The two support walls 437a and 437b may be formed by bending the extension wings 438a and 438b until the extension wings 438a and 438b become approximately perpendicular to the main body 131. Bending grooves (not illustrated) may be disposed between the main body 131 and the extension wings 438a and 438b.

In the insulating case 430 of the current embodiment, the two support walls 437a and 437b may be disposed on respective long sides of the main body 131. Therefore, the insulating case 430 may be easily manufactured. That is, the main body 131 and the extension wings 438a and 438b may have a simple rectangular shape.

Stoppers (not shown) of a can (not shown) may be formed corresponding to the support walls 437a and 437b to prevent separation of the insulating case 430 from the can.

Figure 8:
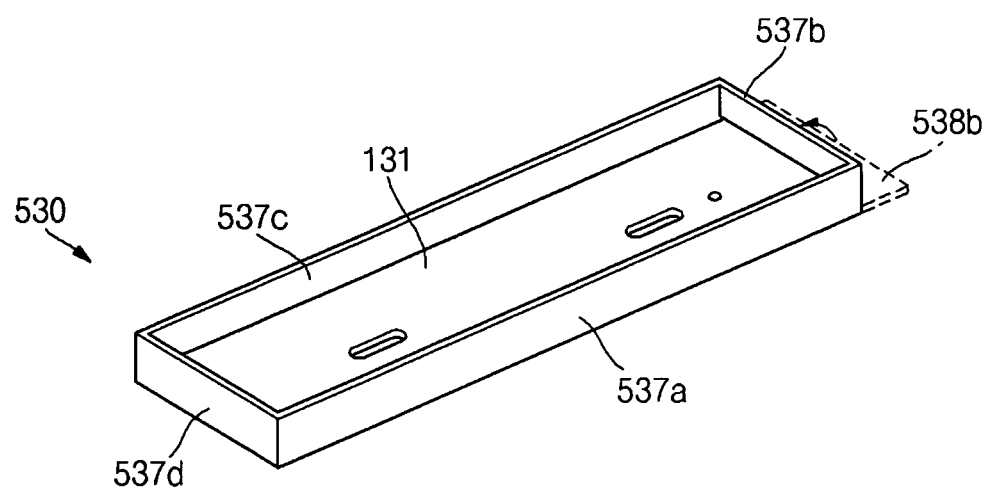
FIG. 8 illustrates a perspective view of an insulating case included in a secondary battery according to a still further embodiment.

Next, a secondary battery according to another embodiment will be described. FIG. 8 illustrates a perspective view of an insulating case included in a secondary battery according to another embodiment. In the current embodiment, the same elements as those of the embodiment illustrated in FIGS. 1 to 4B are denoted with the same reference numerals.

Referring to FIG. 8, an insulating case 530 may include a main body 131 and four support walls 537a, 537b, 537c, and 537d. The main body 131 of the current embodiment may have the same structure as that of the main body 131 of the embodiment illustrated in FIGS. 1 to 4B, and thus a repeated detailed description of the main body 131 is omitted.

Three support walls 527a, 537c, and 537d of the four support walls 537a, 537b, 537c, and 537d may be connected to each other in one piece. That is, the three support walls 527a, 537c, and 537d may not be formed by bending parts of the main body 131. In other words, the support walls 527a, 537c, and 537d may be connected to each other at edges thereof. The remaining support wall 537b of the four support walls 537a, 537b, 537c, and 537d may be formed by bending a part of the main body 131. In the current embodiment, only one support wall may be formed by bending an extension wing 538b of the main body 131. However, the embodiments are not limited thereto. For example, two or three support walls may be formed by bending extension wings of the main body 131.

Figure 9:
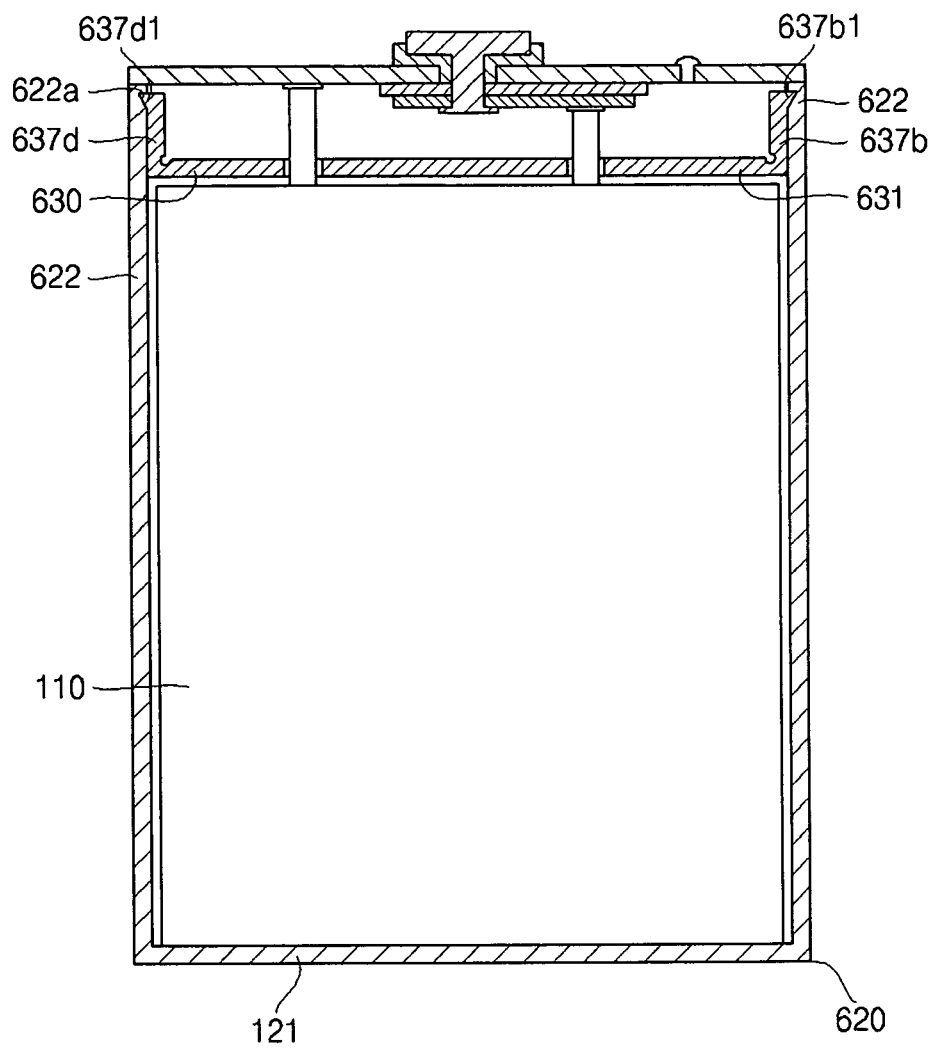
FIG. 9 illustrates a partial sectional view of a secondary battery according to yet another embodiment.

Next, a secondary battery according to another embodiment will be described. FIG. 9 illustrates a partial sectional view of a secondary battery according to another embodiment. In the current embodiment, the same elements as those of the embodiment illustrated in FIGS. 1 to 4B are denoted with the same reference numerals.

Referring to FIG. 9, a secondary battery 600 may include a can 620 and an insulating case 630 accommodated in the can 620. The secondary battery 600 of the current embodiment may have the same structure as that of the secondary battery 100 of the embodiment illustrated in FIGS. 1 to 4B except for the can 620 and the insulating case 630. Therefore, only the can 620 and the insulating case 630 will be described in detail for brevity of description.

The can 620 may include a bottom plate 121 and a sidewall 622 extending upward from edges of the bottom plate 121. Catch grooves 622a may be disposed in an upper, inner surface of the sidewall 622.

The insulating case 630 may include a main body 631 and support walls 637b and 637d that are bent from the main body 631. Latch parts 637b1 and 637b2 may be disposed at ends of the support walls 637b and 637d for insertion into the catch grooves 622a of the can 620. The latch parts 637b1 and 637d1 may have a length corresponding to a length of the catch grooves 622a. The latch parts 637b1 and 637d1 may have an outwardly protruded shape.

According to the embodiments, a secondary battery that may be easily fabricated at lower cost is provided. That is, since the support walls of the insulating case may be formed by bending, the secondary battery may be easily fabricated at lower cost.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
    an electrode assembly;
    a can including a bottom plate and a sidewall extending from the bottom plate, the can being configured to accommodate the electrode assembly;
    a cap plate sealing an opening of the can; and
    an insulating case including a plate-shaped main body facing the electrode assembly and a support part extending from the main body, the insulating case being accommodated in the can,
    wherein:
        the support part of the insulating case includes at least one support wall bent from the main body, the at least one support wall includes side surfaces and a top surface between the side surfaces,
        the can further includes a separation prevention part configured to prevent detachment of the insulating case, the separation prevention part including an inwardly bent extension extending from an upper end of the sidewall and directly the top surface of the at least one support wall and
        the cap plate is on top of the separation prevention part, such that the separation part is between the cap plate and the insulating case.

2. The secondary battery as claimed in claim 1, wherein the insulating case includes a bending groove between the main body and the support wall.

3. The secondary battery as claimed in claim 1, wherein:

the at least one support wall includes a plurality of support walls separated from each other, the inwardly bent extension includes a plurality of inwardly bent extensions, the inwardly bent extensions corresponding to the support walls.

4. The secondary battery as claimed in claim 3, wherein the main body of the insulating case has a rectangular shape with two mutually facing long sides and two mutually facing short sides, and the support walls are disposed on the two mutually facing long sides of the main body.

5. The secondary battery as claimed in claim 3, wherein the main body of the insulating case has a rectangular shape with two mutually facing long sides and two mutually facing short sides, and the support walls are disposed on the two mutually facing short sides of the main body.

6. The secondary battery as claimed in claim 3, wherein the main body of the insulating case has a rectangular shape with two mutually facing long sides and two mutually facing short sides, and the support walls are disposed on long and short sides of the main body.

7. The secondary battery as claimed in claim 6, wherein the support walls have lengths that are the same as lengths of corresponding sides of the main body.

8. The secondary battery as claimed in claim 6, wherein the support walls disposed on the two mutually facing long sides of the main body are shorter in length than the two mutually facing long sides of the main body.

9. The secondary battery as claimed in claim 3, wherein each of the support walls forms an angle of about 75° to about 105° with respect to the main body.

10. The secondary battery as claimed in claim 1, wherein the support part further includes at least one support wall not bent from the main body.

* * * * *